United States Patent
Genz et al.

(10) Patent No.: US 6,444,777 B1
(45) Date of Patent: *Sep. 3, 2002

(54) PROCESS FOR PRODUCING COMPACT OR CELLULAR POLYURETHANE ELASTOMERS BASED ON 3,3' DIMETHYL DIPHENYL 4,4' DIISOCYANATE-CONTAINING POLYISOCYANATE MIXTURES AND ISOCYANATE PREPOLYMERS SUITABLE THEREFOR

(75) Inventors: Manfred Genz, Damme; Gerhard Hellmann, Bad Duerkheim; Walter Haselhorst, Osnabrueck; Torsten Jeschke, Wimmer; Ute Nichau, Lünne; Heinz Bollmann, Alfhausen; Michael Strauss, Lemförde; Wolfgang Scholz, Lemfoerde; Hartmut Peuker, Bissendorf; Rüdiger Voelkel, Bensheim, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 49 days.

(21) Appl. No.: 09/051,595

(22) PCT Filed: Sep. 30, 1996

(86) PCT No.: PCT/EP96/04295

§ 371 (c)(1), (2), (4) Date: Aug. 24, 1998

(87) PCT Pub. No.: WO97/14734

PCT Pub. Date: Apr. 24, 1997

(30) Foreign Application Priority Data

Oct. 14, 1995 (DE) ......................................... 195 38 330

(51) Int. Cl.[7] ........................ C08G 18/10; C08G 18/76; C08J 9/04; C07C 269/02
(52) U.S. Cl. ............... 528/60; 252/182.21; 252/182.22; 521/159; 521/160; 528/59; 528/65; 528/66; 528/67; 528/76; 528/77; 528/80; 528/81; 528/84; 560/25; 560/26; 560/330; 560/359

(58) Field of Search ...................... 252/182.21, 182.22; 528/59, 65, 66, 67, 76, 77, 80, 81, 84, 60; 560/25, 26, 330, 359; 521/159, 160

(56) References Cited

U.S. PATENT DOCUMENTS 2,933,477 A  *  4/1960  Hostettler .................... 525/418
3,457,234 A  *  7/1969  Gianatasio .................... 528/63

OTHER PUBLICATIONS

Odaka et al.;"Thermal and Mechanical Properties of TODI–Based Polyurethanes"; International Polymer Science and Technology; vol. 8, No. 12; 1981, pp. T6–T8.*

* cited by examiner

Primary Examiner—Rabon Sergent
(74) Attorney, Agent, or Firm—Fernando A. Borrego (57) ABSTRACT

Compact and preferably cellular polyurethane elastomers based on polyisocyanate mixtures containing 3,3'-dimethylbiphenyl 4,4'-diisocyanate are produced by reacting a) relatively high molecular weight polyhydroxyl compounds and, if desired, b) low molecular weight hydroxyl-containing chain extenders and/or crosslinkers with c) 3,3'-dimethylbiphenyl 4,4'-diisocyanate and at least one additional aromatic diisocyanate selected from the group consisting of tolylene diisocyanate, diphenylmethane diisocyanate, 1,2-diphenylethane diisocyanate and phenylene diisocyanate, and/or at least one aliphatic diisocyanate having from 4 to 12 carbon atoms and/or at least one cycloaliphatic diisocyanate having from 6 to 18 carbon atoms, where the formative components (a), (c) and, if used, (b) are advantageously reacted by the prepolymer method, in the presence or absence of d) catalysts,
e) blowing agents and
f) additives.

Isocyanate prepolymers suitable for this purpose are preferably ones based on diphenylmethane 4,4'-diisocyanate and 3,3'-dimethylbiphenyl 4,4'-diisocyanate.

18 Claims, 1 Drawing Sheet

Figure

PROCESS FOR PRODUCING COMPACT OR CELLULAR POLYURETHANE ELASTOMERS BASED ON 3,3' DIMETHYL DIPHENYL 4,4' DIISOCYANATE-CONTAINING POLYISOCYANATE MIXTURES AND ISOCYANATE PREPOLYMERS SUITABLE THEREFOR

The present invention relates to a process for producing compact and preferably cellular polyurethane elastomers based on polyisocyanate mixtures containing 3,3'-dimethylbiphenyl 4,4'-diisocyanate, hereinafter also referred to in abbreviated form as PU elastomers, by reacting a) relatively high molecular weight polyhydroxyl compounds and, if desired, b) low molecular weight hydroxyl-containing chain extenders and/or crosslinkers with c) 3,3'-dimethylbiphenyl 4,4'-diisocyanate and at least one additional aromatic diisocyanate selected from the group consisting of tolylene diisocyanate, diphenylmethane diisocyanate, 1,2-diphenylethane diisocyanate and phenylene diisocyanate, and/or at least one aliphatic diisocyanate having from 4 to 12 carbon atoms and/or at least one cycloaliphatic diisocyanate having from 6 to 18 carbon atoms, where the formative components (a), (c) and, if used, (b) are preferably reacted by the prepolymer method, in the absence or preferably in the presence of d) catalysts, e) blowing agents and f) additives, and isocyanate prepolymers suitable for this purpose, preferably those based on diphenylmethane 4,4'-diisocyanate (MDI) and 3,3'-dimethylbiphenyl 4,4'-diisocyanate (TODI).

The microcellular PU elastomers have excellent static and dynamic properties. Owing to their specific damping characteristics and long-term use properties, they are used particularly in vibration- and shock-damping systems.

The production of compact or cellular, eg. microcellular, PU elastomers has been known for a long time from numerous patent and literature publications.

Their industrial importance is based on the combination of good mechanical properties with the advantages of low-cost processing methods. The use of various types of chemical formative components in different mixing ratios enables the production of thermoplastically processible or crosslinked, compact or cellular PU elastomers which have a wide variety of processing behaviors and mechanical properties. An overview of PU elastomers, their properties and uses is given, for example, in the Kunststoff-Handbuch, Volume 7, Polyurethane. 1st Edition, 1966, edited by Dr. R. Vieweg and Dr. A. Höchtlen, 2nd Edition, 1983, edited by Dr. G. Oertel, and 3rd edition, 1993, edited by Prof. G. W. Becker and Prof. D. Braun, Carl-Hanser-Verlag, Munich, Vienna.

In comparison with the types of rubber which can be used in a similar manner, microcellular PU elastomers have significantly better damping properties with an excellent volume compressibility, so that they are used as constituents of vibration- and shock-damping systems, particularly in the automobile industry. To produce microcellular PU elastomers, useful starting materials have been found to be the reaction products of naphthylene 1,5-diisocyanate (1,5-NDI) and poly(ethylene glycol adipate) having a molecular weight of 2,000, which are reacted in the form of an isocyanate prepolymer with an activator-containing aqueous solution of a fatty acid sulfonate. (Kunststoff-Handbuch, Volume 7, Polyurethane, 1st Edition, page 270 ff.)

Since such base formulations give microcellular PU elastomers having very good damping characteristics and static and dynamic performance parameters, the prior art has disclosed only isolated efforts to replace the 1,5-NDI, which is responsible for the good elastomer properties but is more difficult to handle because of its high melting point, by more easily handled and less costly diisocyanates, since this results in significant losses in mechanical properties. Characteristic property differences between compact PU elastomers in general and microcellular PU elastomers in particular based on 1,5-NDI, tolylene diisocyanate (TDI) and 4,4'-MDI are shown in Journal of Elastomers and Plastics, Vol. 21 (1989), pages 100 to 121. Important disadvantages of a microcellular PU elastomer based on 4,4'-MDI are given as a distinctly higher degree of damping with increased heating of the material and significantly increased consolidation on dynamic loading, which finally lead to quicker material wear in comparison with PU elastomers based on 1,5-NDI.

Despite these obvious disadvantages, attempts have been made in the production of microcellular PU elastomers to replace the 1,5-NDI by the lower-melting and lower-cost 4,4'-MDI. However, these experiments have been restricted to the use of new starting components, in particular relatively high molecular weight polyhydroxyl compounds, the use of which has improved certain mechanical properties of the microcellular PU elastomers.

EP-A-0 496 204 (U.S. Pat. No. 5,173,518) describes a process for producing cellular PU elastomers using polyether polycarbonate diols, which comprise condensed polyoxytetramethylene glycol units having a mean molecular weight of from 150 to 500, as relatively high molecular weight polyhydroxyl compounds. This improves the mechanical properties, in particular the elongation at break, even at relatively low temperatures. However, it is not possible to recognize any improvement in the static compressive set values in accordance with DIN 53 572 at 70° C. which are known to correlate with the dynamic consolidation values. Even when using 1,5-NDI as polyisocyanate, only average static compressive set values are obtained.

EP-B-0 243 832 (U.S. Pat. No. 4,798,851), which describes the use of pseudoprepolymers based on 4,4'-MDI, for example in combination with water as blowing agent, for producing elastic, compact or cellular PU or PU-polyurea moldings, teaches the use of a hydroxyl-containing polycondensate from a short-chain polyoxytetramethylene glycol and an aliphatic dicarboxylic acid as relatively high molecular weight polyhydroxyl compound, with the object of obtaining a polyhydroxyl compound containing ester groups and readily able to be metered by means of pumping for producing cellular or compact PU elastomers having improved mechanical and hydrolytic properties. Details of the permanent deformation on static or dynamic loading, by means of which vibration-resistant materials are usually characterized, are not disclosed.

DE-A-36 13 961 (U.S. Pat. No. 4,647,596) describes a microcellular PU elastomer based on 4,4'-MDI which, owing to a defined composition of the relatively high molecular weight polyhydroxyl compounds, comprising a copolymer of polytetrahydrofuran and ε-caprolactone, has mechanical properties which represent a useful compromise between static strength and dynamic stressability. Despite the use of expensive raw materials for producing the polyhydroxyl compounds, the gain in performance achieved thereby appears to be relatively small in terms of the test parameters "product durability, flexural strength by the De Mattia method and permanent deformation at 50% compression". For example, the measured values for the compressive set, which are directly related to the practically important value of the dynamic consolidation, show only slight improvements when the teachings of the invention are applied.

In addition, the test criteria used, viz. "product durability and flexural strength by the De Mattia method" appear insufficiently suitable for an evaluation of the dynamic properties which is close to practice, since, especially in the case of partial property improvements, they are not able to give a satisfactory picture of the real performance differences between 4,4'-MDI-based and 1,5-NDI-based polyurethane elastomers. Thus, the example based on 1,5-NDI shows no better level of properties than the examples based on 4,4'-MDI.

Also known is the stepwise production of PU elastomers. According to DE-A-25 47 864 (U.S. Pat. No. 4,191,818), a heat-resistant PU elastomer can be produced by reacting an essentially linear relatively high molecular weight dihydroxyl compound with an excess of diisocyanate to give an adduct containing terminal hydroxyl groups and subsequently reacting this adduct with a symmetric aromatic diisocyanate in excess and alkanediols or di(alkylene glycol) terephthalates as chain extenders. If cellular PU elastomers are to be produced by this method, the chain extenders used can also be water, if desired in combination with alkanediols and/or di(alkylene glycol) terephthalates.

Cellular PU elastomers can also be produced by the process described in DE-A-2 940 856 (U.S. Pat. No. 4,334,033). According to this process, the relatively high molecular weight polyhydroxyl compounds and possibly chain extenders are reacted with an organic diisocyanate in a ratio of OH to NCO groups of from 1.2:1 to 2:1 to give a hydroxyl-containing prepolymer. This is divided in a weight ratio of about 80–20:20–80 into a component (I) and (II), the component (I) is reacted with 1,5-NDI in a ratio of OH:NCO groups of 1:2.5–12 to give an NDI-polyurethane adduct containing NCO groups and the component (II) is combined with chain extenders, water and additives to give a mixture (II). The NDI-polyurethane adduct and the mixture (II) are finally reacted to give a cellular or non-cellular PU elastomer. According to this process, the formative components can be metered exactly and mixed rapidly and intensively. The PU elastomers are homogeneous and have uniform mechanical properties over the entire molding.

Curable PU-polyurea prepolymer compositions based on prepolymers containing isocyanate groups and prepared from hydroxyl-containing poly(ethanediol adipates), 2,4-TDI and TODI and hardeners comprising 2-chloroaniline-2,5-dichloroaniline-formaldehyde condensation products are described in GB-A 1 141 323. The compact PU-polyurea elastomers produced therefrom have good mechanical properties, however, the carcinogenic action of the hardeners used is a disadvantage.

It is an object of the present invention to provide a process for producing compact or preferably microcellular PU elastomers in which the expensive TODI can be replaced completely or at least partially by organic diisocyanates which are easier to handle and have a lower cost. Despite the concomitant use of other organic diisocyanates, the mechanical and dynamic properties of the PU elastomers produced should be improved or at least correspond essentially to elastomers based on TODI. Regardless of the type of relatively high molecular weight polyhydroxyl compounds used, the microcellular PU elastomers should have static and mechanical properties which are clearly improved in comparison with PU elastomers based on 4,4'-MDI, in particular they should have compressive sets and dynamic consolidation values such that they can be used, in particular, for producing vibration- and shock-damping systems.

We have found that this object is achieved by a process for producing compact or cellular, preferably microcellular, PU elastomers by reacting a) relatively high molecular weight polyhydroxyl compounds and, if desired, b) low molecular weight hydroxyl-containing chain extenders and/or crosslinkers with c) organic polyisocyanates in the presence or absence of d) catalysts, e) blowing agents and f) additives, wherein the organic polyisocyanates used are 3,3'-dimethylbiphenyl 4,4'-diisocyanate and at least one additional aromatic diisocyanate selected from the group consisting of tolylene diisocyanate, diphenylmethane diisocyanate, 1,2-diphenylethane diisocyanate and phenylene diisocyanate, and/or at least one aliphatic diisocyanate having from 4 to 12 carbon atoms and/or at least one cycloaliphatic diisocyanate having from 6 to 18 carbon atoms.

According to a preferred embodiment, the PU elastomers are produced by the prepolymer process in which a polyaddition product containing urethane and isocyanate groups is advantageously prepared from the relatively high molecular weight polyhydroxyl compound (b) and at least one aromatic diisocyanate selected from the group consisting of TDI, MDI, 1,2-diphenylethane diisocyanate (DIBDI), phenylene diisocyanate (PDI) and preferably 4,4'-MDI and/or hexamethylene 1,6-diisocyanate (HDI) and/or 1-isocyanato-3,3,5-trimethyl-5-isocyanatomethylcyclohexane (IPDI), and this polyaddition product is converted into the prepolymer containing isocyanate groups by reaction with TODI which can be reacted with the polyaddition product in one step or in portions. Microcellular PU elastomers can be produced from such prepolymers containing isocyanate groups by reaction with water or mixtures of water and, if desired, low molecular weight hydroxyl-containing chain extenders and/or hydroxyl-containing crosslinkers (b) and/or relatively high molecular weight polyhydroxyl compounds (a).

The invention also provides prepolymers containing isocyanate groups and having an NCO content of from 3.3 to 10% by weight, preferably from 3.5 to 9.0% by weight, which are prepared by reacting at least one relatively high molecular weight polyhydroxyl compound (a) or a mixture of (a) and at least one low molecular weight hydroxyl-containing chain extender and/or cross-linker (b) with at least one aromatic diisocyanate selected from the group consisting of MDI, DIBDI and PDI, preferably 4,4'-MDI, and/or HDI and/or IPDI to give a polyaddition product containing urethane and isocyanate groups and having an NCO content of advantageously from 0.05 to 8% by weight, preferably from 1.2 to 7.5% by weight, and reacting this polyaddition product with TODI which can be incorporated into the reaction mixture and reacted with the polyaddition product in one step or preferably in portions.

Since the ability to crystallize of the rigid segments comprising urea and/or urethane groups in the PU elastomers based on 1,5-NDI or TODI is considerably impaired by the concomitant use of diisocyanates which crystallize less well, for example the low-cost 4,4'-MDI with its angled structure, those skilled in the art had to assume that the resulting PU elastomers have poorer static and dynamic properties than those based on an aromatic diisocyanate.

It could therefore not be foreseen that the microcellular PU elastomers produced from specifically selected aromatic, aliphatic and/or cycloaliphatic diisocyanate mixtures containing TODI have good mechanical properties which are almost comparable with those of elastomers produced exclusively from TODI and, in comparison with microcellular PU elastomers based on 4,4'-MDI, have clearly improved static, mechanical properties, in particular compressive set and dynamic consolidation values. The microcellular PU elastomers produced by the process of the present invention are thus lower in cost than PU elastomers based on 1,5-NDI or TODI and, owing to their good static, mechanical properties, are very useful for producing vibration- and shock-damping systems. Furthermore, the reaction mixture is simpler to handle and process.

As regards the starting materials (a) to (f) for producing the compact or preferably cellular, eg. microcellular, PU elastomers and the process of the present invention, the following may e said:

a) Suitable relatively high molecular weight polyhydroxyl compounds advantageously have a functionality of at most 3 or preferably 2 and a molecular weight of from 500 to 6,000, preferably from 800 to 3,500 and in particular from 1,000 to 3,300, and advantageously comprise hydroxyl-containing polymers, eg. polyacetals such as polyoxymethylenes and especially water-insoluble formals, eg. polybutanediol formal and polyhexanediol formal, polyoxyalkylene polyols such as polyoxybutylene glycols, polyoxybutylene-polyoxyethylene glycols, polyoxybutylene-polyoxypropylene glycols, polyoxybutylene-polyoxypropylene-polyoxyethylene glycols, polyoxypropylene polyols and polyoxypropylene-polyoxyethylene polyols, and polyester polyols, eg. polyester polyols from organic dicarboxylic acids and/or dicarboxylic acid derivatives and dihydric and/or trihydric alcohols and/or dialkylene glycols, from hydroxycarboxylic acids and lactones and also hydroxyl-containing polycarbonates.

Relatively high molecular weight polyhydroxyl compounds which have been found to be very useful and are therefore preferably used are difunctional polyhydroxyl compounds having molecular weights of from greater than 800 to 3,500, preferably from 1,000 to 3,300, and selected from the group consisting of polyester polyols, hydroxyl-containing polycarbonates and polyoxybutylene glycols. The relatively high molecular weight polyhydroxyl compounds can be used individually or as mixtures.

Suitable polyoxyalkylene polyols can be prepared by known methods, for example by anionic polymerization using alkali metal hydroxides such as sodium or potassium hydroxide, or alkali metal alkoxides such as sodium methoxide, sodium or potassium ethoxide or potassium isopropoxide, as catalysts and with addition of at least one initiator molecule containing 2 or 3, preferably 2, reactive hydrogen atoms in bonded form, or by cationic polymerization using Lewis acids such as antimony pentachloride, boron fluoride etherate, etc., or bleaching earth as catalysts, from one or more alkylene oxides having from 2 to 4 carbon atoms in the alkylene radical.

Suitable alkylene oxides are, for example, 1,3-propylene oxide, 1,2- or 2,3-butylene oxide, preferably ethylene oxide and 1,2-propylene oxide and in particular tetrahydrofuran. The alkylene oxides can be used individually, alternately in succession or as a mixture. Examples of suitable initiator molecules are: water, organic dicarboxylic acids such as succinic acid, adipic acid, phthalic acid and terephthalic acid, aliphatic and aromatic, N-monoalkylated and N,N'-dialkylated diamines having from 1 to 4 carbon atoms in the alkyl radical, for example monoalkylated and dialkylated ethyleneamine [sic], 1,3-propylenediamine, 1,3- or 1,4-butylenediamine, 1,2-, 1,3-, 1,4-, 1,5- and 1,6-hexamethylenediamine, alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using dihydric and/or trihydric alcohols, eg. alkanediols having from 2 to 12 carbon atoms, preferably from 2 to 4 carbon atoms, for example ethanediol, 1,2- and 1,3-propanediol, 1,4-butanediol, 1,5-pentanediol, 1,6-hexanediol, glycerol and trimethylolpropane, and dialkylene glycols such as diethylene glycol and dipropylene glycol.

Polyoxyalkylene polyols which are preferably used are polyoxybutylene glycols (polyoxytetramethylene glycols) having molecular weights of from 500 to 3,000, preferably from 650 to 2,300.

Other preferred polyhydroxyl compounds (a) are polyester polyols which can be prepared, for example, from alkanedicarboxylic acids having from 2 to 12 carbon atoms, preferably alkanedicarboxylic acids having from 4 to 6 carbon atoms, and/or aromatic dicarboxylic acids and polyhydric alcohols, preferably alkanediols having from 2 to 12 carbon atoms, preferably from 2 to 6 carbon atoms, and/or dialkylene glycols. Examples of suitable alkanedicarboxylic acids are: succinic acid, glutaric acid, adipic acid, suberic acid, azelaic acid, sebacic acid and decanedicarboxylic acid. Suitable aromatic dicarboxylic acids are, for example, phthalic acid, isophthalic acid and terephthalic acid. The alkanedicarboxylic acids can here be used either individually or in admixture with one another. In place of the free dicarboxylic acids, it is also possible to use the corresponding dicarboxylic acid derivatives such as dicarboxylic monoesters or diesters of alcohols having from 1 to 4 carbon atoms or dicarboxylic anhydrides. Preference is given to using dicarboxylic acid mixtures of succinic, glutaric and adipic acids in weight ratios of, for example, 20–35:35–50:20–32, and in particular adipic acid. Examples of dihydric and polyhydric alcohols, in particular alkanediols or dialkylene glycols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol 1,5-pentanediol, 1,6-hexanediol or mixtures of at least two of the specified diols, in particular mixtures of 1,4-butanediol, 1,5-pentanediol and 1,6-hexanediol. It is also possible to use polyester polyols from lactones, eg. ε-caprolactone, or hydroxycarboxylic acids, eg. ω-hydroxycaproic acid.

To prepare the polyester polyols, the aromatic and/or aliphatic dicarboxylic acids and preferably alkanedicarboxylic acids and/or derivatives and polyhydric alcohols can be polycondensed in the absence of catalysts or preferably in the presence of esterification catalysts, advantageously in an atmosphere of inert gases such as nitrogen, helium, argon, etc., in the melt at from 150 to 250° C., preferably from 180 to 220° C., at atmospheric pressure or under reduced pressure to the desired acid number which is advantageously less than 10, preferably less than 2. According to a preferred embodiment, the esterification mixture at the abovementioned temperatures is polycondensed to an acid number of from 80 to 30, preferably from 40 to 30, at atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene for azeotropically distilling off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

Polyester polyols which are preferably used are poly(alkanediol adipates) such as poly(ethanediol adipates), poly(1,4-butanediol adipates), poly(ethanediol-1,4-butanediol adipates), poly(1,6-hexanediol-neopentyl glycol adipates) and poly(1,6-hexanediol-1,4-butanediol adipates) and polycaprolactones.

Other suitable polyester polyols are hydroxyl-containing polycarbonates. Such hydroxyl-containing polycarbonates can be prepared, for example, by reacting the abovementioned alkanediols, in particular 1,4-butanediol and/or 1,6-hexanediol, and/or dialkylene glycols such as diethylene glycol, dipropylene glycol and dibutylene glycol, with dialkyl or diaryl carbonates, eg. diphenyl carbonate, or phosgene.

As hydroxyl-containing polycarbonates, preference is given to using polyether polycarbonate diols which can be prepared by polycondensation of a1) polyoxybutylene glycol having a molecular weight of from 150 to 500 or of a2) mixtures comprising
  i) at least 10 mol %, preferably from 50 to 95 mol %, of a polyoxybutylene glycol having a molecular weight of from 150 to 500 (a1) and
  ii) less than 90 mol %, preferably from 5 to 50 mol %, of at least one polyoxyalkylene glycol different from (a1) and having a molecular weight of from 150 to 2,000, at least one dialkylene glycol, at least one linear or branched alkanediol having from 2 to 12 carbon atoms and [sic] at least one cyclic alkanediol having from 5 to 15 carbon atoms or mixtures thereof with phosgene, diphenyl carbonate or dialkyl carbonates having $C_1$–$C_4$-alkyl groups.

b) To produce the compact or preferably cellular PU elastomers by the process of the present invention, it is also possible to use, if desired, low molecular weight, hydroxyl-containing difunctional chain extenders (b), low molecular weight, hydroxyl-containing, preferably trifunctional or tetrafunctional crosslinkers (b) or mixtures of chain extenders and crosslinkers in addition to the relatively high molecular weight polyhydroxyl compounds (a).

Such chain extenders and crosslinkers (b) are used to modify the mechanical properties, in particular the hardness, of the PU elastomers. Suitable hydroxyl-containing chain extenders, for example alkanediols, dialkylene glycols and polyoxyalkylene glycols, and hydroxyl-containing crosslinkers, eg. trihydric or tetrahydric alcohols and oligomeric polyoxyalkylene polyols having a functionality of from 3 to 4, usually have molecular weights less than 800, preferably from 18 to 400 and in particular from 60 to 300. As chain extenders, preference is given to using alkanediols having from 2 to 12 carbon atoms, preferably 2,4 or 6 carbon atoms, for example ethanediol, 1,3-propanediol, 1,5-pentanediol, 1,6-hexanediol, 1,7-heptanediol, 1,8-octanediol, 1,9-nonanediol, 1,10-decanediol and in particular 1,4-butanediol, and dialkylene glycols having from 4 to 8 carbon atoms, for example diethylene glycol and dipropylene glycol and also polyoxyalkylene glycols. However, it is also possible to use branched and/or unsaturated alkanediols usually having not more than 12 carbon atoms, for example 1,2-propanediol, 2-methylpropane-1,3-diol, 2,2-dimethylpropane-1,3-diol, 2-butyl-2-ethylpropane-1,3-diol, but-2-en-1,4-diol and but-2-yn-1,4-diol, diesters of terephthalic acid with alkanediols having from 2 to 4 carbon atoms, for example bis(ethylene glycol) terephthalate or bis(1,4-butanediol) terephthalate, and hydroxyalkylene ethers of hydroquinone or resorcinol, for example 1,4-di(β-hydroxyethyl)hydroquinone or 1,3-di(β-hydroxyethyl)resorcinol.

Examples which may be mentioned of at least trifunctional crosslinkers which can advantageously be concomitantly used for producing the PU casting elastomers are: trihydric and tetrahydric alcohols such as glycerol, trimethylolpropane, pentaerythritol and trihydroxycyclohexanes and also oligomeric polyoxyalkylene polyols having a functionality of from 3 to 4.

The chain extenders and crosslinkers (b) which are suitable for the purposes of the present invention can be used individually or in the form of mixtures. It is also possible to use mixtures of chain extenders and crosslinkers.

To adjust the hardness of the PU elastomers, the mixing ratios of the formative components (a) and (b) can be varied within relatively wide ranges, with the hardness increasing with increasing content of difunctional chain extenders and at least trifunctional crosslinkers in the PU elastomer.

Depending on the desired hardness, the required amounts of the formative components (a) and (b) can be experimentally determined in a simple manner. It is advantageous to use, based on the weight of the relatively high molecular weight polyhydroxyl compound, from 5 to 50% by weight of the chain extender and/or crosslinker (b), with preferably from 30 to 50% by weight being used to produce rigid PU elastomers.

c) To produce the compact and preferably microcellular PU elastomers, use is made according to the present invention of two organic polyisocyanates of which one is TODI. As aromatic diisocyanates different from TODI, use is made of tolylene diisocyanates, eg. 2,4- and 2,6-TDI and commercial mixtures, diphenylmethane diisocyanates, eg. 2,4'-, 2,2'- and preferably 4,4'-MDI and mixtures of at least two of the specified MDI isomers, 1,2-diphenylethane diisocyanates, eg. 2,4'-, 2,2'- and preferably 4,4'-DIBDI and mixtures of at least two of the specified DIBDI isomers, and phenylene diisocyanates, preferably 1,4-PDI (p-phenylene diisocyanate; PPDI). Owing to its good processability and the very good mechanical properties of the elastomers which can be achieved therewith, 4,4'- MDI is particularly preferably used in combination with TODI to produce the compact and preferably microcellular PU elastomers. The molar ratio of TODI to the aromatic diisocyanates selected from the group consisting of TDI, MDI, DIBDI and PDI can be varied over a wide range, eg. TODI to aromatic diisocyanates of from 1:0.1 to 1:10, preferably from 1:0.11 to 1:9 and in particular from 1:1 to 1:7, without the static and dynamic properties being significantly changed. When using TODI and 4,4'-MDI, the preferred combination, the TODI/4,4'-MDI molar ratio is advantageously in the range from 1:0.1 to 1:10, preferably from 1:0.11 to 1:9 and in particular from 1:1 to 1:7. The aromatic diisocyanates can, if necessary, be melted individually and mixed or mixed and melted together and then used as melt for producing the PU elastomers, or the solid diisocyanate can be introduced into the melt of the other diisocyanate and melted and dissolved therein. According to the latter method, solid TODI (melting point: 70° C.) is usually introduced into a melt of 4,4'-MDI and dissolved with melting.

In place of the aromatic diisocyanates or in admixture with these, it is also possible to use aliphatic diisocyanates having from 4 to 12 carbon atoms, preferably from 4 to 6 carbon atoms, in the branched or preferably linear alkylene radical and/or cycloaliphatic diisocyanates having from 6 to 18 carbon atoms, preferably from 6 to 10 carbon atoms, in the unsubstituted or alkyl-substituted cycloalkylene radical for producing the compact and preferably cellular PU elastomers. Examples which may be mentioned of aliphatic diisocyanates are dodecane 1,12-diisocyanate, 2-ethylbutane 1,4-diisocyanate, 2-methylpentane 1,5-diisocyanate, butane 1,4-diisocyanate and preferably hexamethylene 1,6-diisocyanate (HDI). Examples of suitable cycloaliphatic diisocyanates are: cyclohexane 1,3- and 1,4-diisocyanate, hexahydrotolylene 2,4- and 2,6-diisocyanate, dicyclohexylmethane 4,4'-, 2,4'- and 2,2'-diisocyanate and preferably 1-isocyanato-3,3,5-trimethyl-5-isocyanatomethylcyclohexane (isophorone diisocyanate, IPDI).

However, preference is given to embodiments in which the organic polyisocyanates (c) can be used in the form of a prepolymer containing isocyanate groups. These can be prepared, for example, by reacting the TODI-containing diisocyanate melt with at least one relatively high molecular weight polyhydroxyl compound (a) or a mixture of (a) and at least one low molecular weight hydroxyl-containing chain extender and/or at least one hydroxyl-containing crosslinker (b), or by stepwise reaction of the TODI-containing diisocyanate melt with at least one relatively high molecular weight polyhydroxyl compound (a) and subsequently with at least one hydroxyl-containing chain extender and/or crosslinker (b).

However, preference is given to using prepolymers containing isocyanate groups which are prepared by reacting a partial amount or the total amount of at least one relatively high molecular weight polyhydroxyl compound (a) or a partial amount or the total amount of the mixture of (a) and at least one low molecular weight hydroxyl-containing chain extender and/or crosslinker (b) with at least one aromatic diisocyanate selected from the group consisting of TDI, MDI, DIBDI and PDI, preferably with 4,4'-MDI and/or HDI and/or IPDI to give a polyaddition product containing urethane groups, preferably urethane and isocyanate groups, and having an NCO content of from 0.05 to 8.0% by weight, preferably from 1.2 to 7.5% by weight, and reacting this with TODI to give the prepolymer containing isocyanate groups.

To prepare the polyaddition products containing urethane and isocyanate groups, the formative components (a), if desired (b) and (c) are advantageously used in such amounts that the equivalence ratio of the hydroxyl groups of (a) or (a) and (b) to isocyanate groups of the aromatic diisocyanates TDI, MDI, DIBDI and PDI, preferably 4,4'-MDI, and/or HDI and/or IPDI is 1:>1 to 6, preferably 1:1.01–4. The polyaddition products containing urethane and isocyanate groups are then converted into the prepolymer containing isocyanate groups by reaction with an amount of TODI which can be reacted in one step or preferably in portions in a plurality of steps, preferably in two steps, so that the equivalence ratio of the hydroxyl groups of (a) or (a) and (b) to isocyanate groups of TODI is 1:0.02–6, preferably 1:0.1–5 and in particular 1:0.2–3.

As already indicated, the prepolymers containing isocyanate groups can be prepared using mixtures of (a) and (b). However, according to a preferred embodiment, the prepolymers containing isocyanate groups are prepared by reacting exclusively relatively high molecular weight polyhydroxyl compounds (a) with the polyisocyanates (c), preferably with 4,4'-MDI and TODI. Particularly suitable for this purpose are difunctional polhydroxyl compounds having a molecular weight of from 500 to 6,000, preferably from greater than 800 to 3,500 and in particular from 1,000 to 3,300, which are selected from the group consisting of polyester polyols, hydroxyl-containing polycarbonates and polyoxytetramethylene glycols.

When using 4,4'-MDI and TODI as aromatic diisocyanates, it has been found to be useful to employ equivalence ratios of the hydroxyl groups of (a) and (b), preferably exclusively of (a), to NCO groups of the 4,4'-MDI to NCO groups of the TODI of 1:>1 to 6:0.02–6.

The prepolymers containing isocyanate groups which can be used according to the present invention and are preferably prepared by the abovementioned process variants advantageously have isocyanate contents of from 3.3 to 10% by weight, preferably from 3.5 to 9% by weight, based on their total weight.

To prepare the prepolymers containing isocyanate groups, the relatively high molecular weight polyhydroxyl compounds (a) or mixtures of (a) and low molecular weight, hydroxyl-containing chain extenders and/or crosslinkers (b) can be reacted at from 80 to 160° C., preferably from 110 to 150° C., with the organic polyisocyanates (c), for example in the form of a TODI-containing aromatic diisocyanate mixture or preferably in stages, with at least one aromatic diisocyanate selected from the group consisting of TDI, MDI, DIBDI and PDI, preferably 4,4'-MDI, being used first followed by TODI.

Thus, for example, the total amount or, if desired, partial amounts of TODI can be dissolved in an aromatic diisocyanate, preferably 4,4'-MDI, heated to, for example, 110° C. and the polyhydroxyl compound (a) and, if used, hydroxyl-containing chain extenders and/or crosslinkers (b) heated to, for example, 125° C. can be added to the diisocyanate mixture. After going through the maximum reaction temperature, which is usually in the range from 130 to 150° C., any remaining partial amounts of TODI can be added and reacted during the cooling phase, eg. at from 120 to 130° C.

According to another process variant which is preferably used, the component (a) or a mixture of (a) and (b) can be heated, for example, to 140° C. and at this temperature, for example, the aromatic diisocyanate, preferably the total amount of the 4,4'-MDI heated to 50° C., can be added. Immediately after the addition of the 4,4'-MDI, the total amount of TODI can be incorporated or partial amounts of TODI can be added gradually. It has been found to be advantageous to incorporate a partial amount of TODI immediately after the addition of the 4,4'-MDI and to incorporate the other partial amount(s) into the reaction mixture during the cooling phase.

After reaching the theoretically calculated isocyanate content, the reaction is stopped. This usually requires reaction times in the range from 15 to 200 minutes, preferably from 40 to 150 minutes.

The prepolymers containing isocyanate groups can be prepared in the presence of catalysts. However, it is also possible to prepare the prepolymers containing isocyanate groups in the absence of catalysts and to incorporate these into the reaction mixture for producing the PU elastomers.

d) Catalysts (d) used are advantageously compounds which strongly accelerate the reaction of the hydroxyl-containing compounds of the component (a) and, if used, (b) with the polyisocyanates (c). Suitable catalysts are organic metal compounds, preferably organic tin compounds such as the tin(II) salts of organic carboxylic acids, eg. tin(II) acetate, tin(II) octoate, tin(II) ethylhexanoate and tin(II) laurate, and the dialkyltin(IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetraalkylalkylenediamines such as N,N,N',N'-tetramethylethylenediamine, N,N,N',N'-tetramethylbutanediamine or N,N,N',N'-tetramethylhexanediamine, pentamethyldiethylenetriamine, bis(dimethylaminoethyl) ether, bis(dimethylaminopropyl)urea, 1,4-dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. Preference is given to using from 0.001 to 3% by weight, in particular from 0.01 to 1% by weight, of catalyst or catalyst combination, based on the weight of the formative components (a), (c) and, if used, (b).

e) According to the process of the present invention, compact PU elastomers such as PU casting elastomers can be produced in the absence of moisture and of physically or chemically acting blowing agents. However, the process is preferably used for producing cellular, preferably microcellular PU elastomers. For this purpose, water is used as blowing agent (e), this reacting in situ with the organic polyisocyanates and preferably prepolymers containing isocyanate groups (a) to form carbon dioxide and amino groups which in turn react further with the isocyanate prepolymers to give urea groups and thus act as chain extenders.

Since the formative components (a) and, if used, (b) can, owing to the preparation and/or chemical composition, contain water, there is in some cases no need for a separate addition of water to the formative components (a) and, if used, (b) or to the reaction mixture. However, if additional water has to be incorporated into the polyurethane formulation to achieve the desired bulk density, this is usually used in amounts of from 0.001 to 3.0% by weight, preferably from 0.01 to 2.0% by weight and in particular from 0.2 to 1.2% by weight, based on the weight of the formative components (a) to (c).

As blowing agent (e), it is also possible to use, in place of water or preferably in combination with water, low-boiling liquids which vaporize under the action of the exothermic polyaddition reaction and advantageously have a boiling point at atmospheric pressure in the range from −40 to 120° C., preferably from 10 to 90° C., or gases as physically acting blowing agents or chemically acting blowing agents.

The liquids of the abovementioned type and gases suitable as blowing agents can, for example, be selected from the group consisting of alkanes such as propane, n- and iso-butane, n- and iso-pentane and preferably the industrial pentane mixtures, cycloalkanes and cycloalkenes such as cyclobutane, cyclopentene, cyclohexene and preferably cyclopentane and/or cyclohexane, dialkyl ethers such as dimethyl ether, methyl ethyl ether or diethyl ether, tert-butyl methyl ether, cycloalkylene ethers such as furan, ketones such as acetone, methyl ethyl ketone, acetals and/or ketals such as formaldehyde dimethyl acetal, 1,3-dioxolane and acetone dimethyl acetal, carboxylic esters such as ethyl acetate, methyl formate and tertiary-butyl ethylene-acrylate, tertiary alcohols such as tertiary butanol, fluoroalkanes which are degraded in the troposphere and therefore do not damage the ozone layer, for example trifluoromethane, difluoromethane, difluoroethane, tetrafluoroethane and heptafluoroethane, chloroalkanes such as 2-chloropropane, and gases such as nitrogen, carbon monoxide and noble gases such as helium, neon and krypton, and blowing agents which act chemically analogously to water, for example carboxylic acids such as formic acid, acetic acid and propionic acid.

Among the liquids which are suitable as blowing agents (e) and are inert toward NCO groups, preference is given to using alkanes having from 4 to 8 carbon atoms, cycloalkanes having from 4 to 6 carbon atoms or mixtures having a boiling point of from -40 to 50° C. at atmospheric pressure of alkanes and cycloalkanes. Particular preference is given to using $C_5$-(cyclo) alkanes such as n-pentane, iso-pentanes and cyclopentane and their industrial mixtures.

Other suitable blowing agents are salts which decompose thermally, for example ammonium bicarbonate, ammonium carbamate and/or ammonium salts of organic carboxylic acids such as the monoammonium salts of malonic acid, boric acid, formic acid or acetic acid.

The most advantageous amount of solid blowing agents, low-boiling liquids and gases which can each be used individually or in the form of mixtures, eg. as liquid mixtures, gas mixtures or gas/liquid mixtures, depends on the density which is to be achieved and the amount of water used. The amounts required can easily be determined by simple tests. Satisfactory results are usually given by amounts of solid of from 0.5 to 35 parts by weight, preferably from 2 to 15 parts by weight, amounts of liquid of from 1 to 30 parts by weight, preferably from 3 to 18 parts by weight, and/or amounts of gas of from 0.01 to 80 parts by weight, preferably from 10 to 35 parts by weight, in each case based on the weight of the formative components (a), (c) and, if used, (b). The charging with gas, for example using air, carbon dioxide, nitrogen and/or helium, can be carried out either via the relatively high molecular weight, hydroxyl-containing chain extenders and/or crosslinkers (b) or via the polyisocyanates (c) or via (a) and (c) and, if used, (b).

Blowing agents which are not used are, as indicated above, fully halogenated chlorofluorocarbons.

f) If desired, additives (f) can also be incorporated into the reaction mixture for producing the compact and preferably cellular PU elastomers. Examples which may be mentioned are surface-active substances, foam stabilizers, cell regulators, fillers, flame retardants, nucleating agents, oxidation inhibitors, stabilizers, lubricants and mold release agents, dyes and pigments.

Suitable surface-active substances are, for example, compounds which serve to aid the homogenization of the starting materials and may also be suitable for regulating the cell structure. Examples which may be mentioned are emulsifiers such as the sodium salts of castor oil sulfates or of fatty acids and also amine salts of fatty acids, for example diethylamine oleate, diethanolamine stearate, diethanolamine ricinoleate, salts of sulfonic acids, eg. alkali metal or ammonium salts of dodecylbenzene- or dinaphthylmethanedisulfonic acid and ricinoleic acid; foam stabilizers such as siloxaneoxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. Oligomeric polyacrylates having polyoxyalkylene and fluoroalkane radicals as side groups are also suitable for improving the emulsifying action, the cell structure and/or its stabilization. The surface-active substances are usually used in amounts of from 0.01 to 5 parts by weight per 100 parts by weight of the relatively high molecular weight polyhydroxyl compounds (a).

For the purposes of the present invention, fillers, particularly reinforcing fillers, are the customary organic and inorganic fillers, reinforcements and weighting agents known per se. Specific examples are: inorganic fillers such as siliceous minerals, for example sheet silicates such as antigorite, serpentine, hornblendes, amphiboles, chrysotile, talc; metal oxides such as kaolin, aluminum oxides, aluminum silicate, titanium oxides and iron oxides, metal salts such as chalk, barite and inorganic pigments such as cadmium sulfide, zinc sulfide and glass particles. Suitable organic fillers are, for example: carbon black, melamine, expanded graphite, rosin, cyclopentadienyl resins and graft polymers.

As reinforcing fillers, preference is given to using fibers, for example carbon fibers or in particular glass fibers, particularly when a high heat distortion resistance or very high stiffness is required, with these fibers being able to be coated with coupling agents and/or sizes. Suitable glass fibers, [lacuna] are, for example, also used in the form of woven glass fabrics, glass mats, glass nonwovens and/or preferably glass fiber rovings or chopped glass fibers of lowalkali E glass having a diameter of from 5 to 200 $\mu$m, preferably from 6 to 15 $\mu$m, generally have a mean fiber length after incorporation into the molding compositions of from 0.05 to 1 mm, preferably from 0.1 to 0.5 mm.

The inorganic and organic fillers can be used individually or as mixtures and are usually incorporated into the reaction mixture in amounts of from 0.5 to 50% by weight, preferably from 1 to 30% by weight, based on the weight of the formative components (a) to (c).

Suitable flame retardants are, for example, tricresyl phosphate, tris(2-chloroethyl)phosphate, tris(2-chloropropyl) phosphate, tris(1,3-dichloropropyl) phosphate, tris(2,3-dibromopropyl) phosphate and tetrakis(2-chloroethyl)ethylene diphosphate.

Apart from the abovementioned halogen-substituted phosphates, it is also possible to use inorganic flame retardants such as red phosphorus, hydrated aluminum oxide, antimony trioxide, arsenic trioxide, ammonium polyphosphate and calcium sulfate or cyanuric acid derivatives such as melamine or mixtures of at least two flame retardants such as ammonium polyphosphates and melamine and also, if desired, starch and/or expanded graphite for making the PU elastomers produced according to the present invention flame resistant. In general, it has been found to be advantageous to employ from 5 to 50 parts by weight, preferably from 5 to 25 parts by weight, of the specified flame retardants or mixtures, in each case per 100 parts by weight of the formative components (a) to (c).

Nucleating agents which can be used are, for example, talc, calcium fluoride, sodium phenylphosphinate, aluminum oxide and finely divided polytetrafluoroethylene in amounts of up to 5% by weight, based on the total weight of the formative components (a) to (c).

Suitable oxidation inhibitors and heat stabilizers which can be added to the PU elastomers of the present invention are, for example, halides of metals of group I of the Periodic Table, eg. sodium, potassium, lithium halides, if desired in combination with copper(I) halides, eg. chlorides, bromides or iodides, sterically hindered phenols, hydroquinones, and also substituted compounds of these groups and mixtures thereof, which are preferably used in concentrations of up to 1% by weight, based on the weight of the formative components (a) to (c).

Examples of UV stabilizers are various substituted resorcinols, salicylates, benzotriazoles and benzophenones and also sterically hindered amines, which are generally used in amounts of up to 2.0% by weight, based on the weight of the formative components (a) to (c).

Lubricants and mold release agents, which are generally like-wise added in amounts of up to 1% by weight, based on the weight of the formative components (a) to (c), are stearic acid, stearyl alcohol, stearic esters and stearamides and also the fatty acid esters of pentaerythritol.

In addition, it is possible to add organic colorants such as nigrosine, pigments, eg. titanium dioxide, cadmium sulfide, cadmium sulfide selenide, phthalocyanines, ultramarine blue or carbon black.

Details of the other customary auxiliaries and additives mentioned above can be found in the specialist literature, for example the monograph by J. H. Saunders and K. C. Frisch "High Polymers", Volume XVI, Polyurethanes, parts 1 and 2, Interscience Publishers 1962 and 1964, or Kunststoff-Handbuch, Polyurethane, Volume VII, Carl-Hanser-Verlag, Munich, Vienna, 1st, 2nd and 3rd Editions, 1966, 1983 and 1993.

To produce the compact or preferably cellular PU elastomers, the relatively high molecular weight polyhydroxyl compounds (a), if desired low molecular weight chain extenders and/or crosslinkers (b) and, if desired, the chemically acting blowing agents, preferably water, can, in the presence or absence of catalysts (d), physically acting blowing agents (e) and additives (f), be reacted with organic polyisocyanates (c) or preferably the prepolymers containing isocyanate groups and prepared from (a), (b) and (c) or preferably from (a) and (c) and hydroxyl-containing chain extenders and/or crosslinkers (b), mixtures of partial amounts of (a) and (b), mixtures of partial amounts of (a), (b) and water or preferably mixtures of (b) and water or water, in such amounts that the equivalence ratio of NCO groups of the polyisocyanates (c) or prepolymers containing isocyanate groups to the sum of the reactive hydrogens of the components (a) and, if used, (b) and also, if used, the chemically acting blowing agents is 0.8–1.2:1, preferably 0.95–1.15:1 and in particular 1.00–1.05:1.

The compact or preferably cellular PU elastomers can be produced by the methods described in the literature, for example the one-shot or preferably prepolymer process, using known mixing equipment.

To produce the compact PU elastomers, the starting components can be homogeneously mixed in the absence of blowing agents (e), usually at from 80 to 160° C., preferably from 110 to 150° C., the reaction mixture can be introduced into an open, heated or unheated mold and allowed to cure. To form cellular PU elastomers, the formative components can be similarly mixed in the presence of blowing agents, preferably water, and introduced into the heated or unheated mold. After the mixture has been placed in the mold, the latter is closed and the reaction mixture is allowed to foam with compaction, eg. with a degree of compaction of from 1.1 to 8, preferably from 1.2 to 6 and in particular from 2 to 4, to form moldings. As soon as the moldings have sufficient strength, they are removed from the mold. The demolding times are dependent, inter alia, on the mold temperature, mold geometry and the reactivity of the reaction mixture and are usually in a range from 10 to 60 minutes.

The compact PU elastomers produced by the process of the present invention have, without filler, a density of from 1.0 to 1.4 g/cm$^3$, preferably from 1.1 to 1.25 g/cm$^3$, with products containing fillers usually having a density of greater than 1.2 g/cm$^3$. The cellular PU elastomers have densities of from 0.2 to 1.1 g/cm$^3$, preferably from 0.35 to 0.80 g/cm$^3$.

The PU elastomers produced by the process of the present invention are used for producing moldings, preferably for machine construction and the vehicle sector. The cellular PU elastomers are particularly suitable for producing damping and cushioning elements, for example for vehicles, preferably motor vehicles, buffers and surface coatings.

EXAMPLES

Comparative Example I a) Preparation of a Prepolymer Containing Isocyanate Groups and Based on 4,4'-MDI 1,000 parts by weight (0.5 mol) of a poly(ethanediol (0.5 mol)-1,4-butanediol (0.5 mol) adipate (1 mol)) having an average molecular weight of 2,000 (calculated from the experimentally determined hydroxyl number) were heated to 140° C. and at this temperature were admixed and reacted while stirring vigorously with 380 parts by weight (1.52 mol) of 4,4'-MDI heated to 50 C.

This gave a prepolymer having an NCO content of 6.19% by weight and a viscosity at 90° C. of 1600 mPa.s (measured using a rotation viscometer from Haake, by means of which the viscosities in the following comparative examples and examples were also measured).

b) Production of Cellular Moldings

The crosslinker component consisted of 20.7 parts by weight of 2,2',6,6'-tetraisopropyldiphenylcarbodiimide, 2.9 parts by weight of a mixture of ethoxylated oleic and ricinoleic acid having an average of 9 ethylene oxide units 3.8 parts by weight of the monoethanolamine salt of n-alkylbenzenesulfonic acid having $C_9$–$C_{15}$-alkyl radicals, 36.3 parts by weight of the sodium salt of sulfated castor oil, 36.3 parts by weight of water and 0.03 parts by weight of a mixture of 30% by weight of pentamethyldiethylenetriamine and 70% by weight of N-methyl-N'-(dimethylaminomethyl)piperazine.

100 parts by weight of the isocyanate prepolymer prepared as described in Comparative Example Ia and heated to 90° C. were intensively stirred with 3.42 parts by weight of the cross-linker component for about 8 seconds. The reaction mixture was then introduced into a closable, metal mold heated to 80° C., the mold was closed and the reaction mixture was allowed to cure. After 25 minutes, the microcellular molding was removed from the mold and was further cured by heating at 110° C. for 16 hours.

The reaction mixture could not be processed into test springs for the dynamic test.

Comparative Example II a) Preparation of a Prepolymer Containing Isocyanate Groups and Based on 4,4'-MDI A mixture of 1,000 parts by weight of the poly(ethanediol-1,4-butanediol adipate) described in Comparative Example I and 3 parts by weight of trimethylolpropane was, using a method similar to Comparative Example I, reacted with 380 parts by weight (1.52 mol) of 4,4'-MDI heated to 50° C.

This gave a prepolymer having an NCO content of 5.80% by weight and a viscosity at 90° C. of 1,750 mPa.s (measured using a rotation viscometer).

b) Production of Cellular Moldings 100 parts by weight of the prepolymer of Comparative Example IIa and 3.1 parts by weight of the crosslinker component of Comparative Example Ib were used to produce moldings by a method similar to Comparative Example I.

Comparative Example III a) Preparation of a Prepolymer Containing Isocyanate Groups and Based on TODI The procedure of Comparative Example Ia was repeated, but 290 parts by weight (1.097 mol) of 3,3'-dimethylbiphenyl 4,4'-diisocyanate (tolidine diisocyanate (TODI)) were used in place of 4,4'-MDI.

This gave a prepolymer having an NCO content of 3.76% by weight and a viscosity at 90° C. of 5,100 mPa.s (measured using a rotation viscometer).

b) Production of Cellular Moldings 100 parts by weight of the prepolymer of Comparative Example IIIa and 2.07 parts by weight of the crosslinker component of Comparative Example Ib were used to produce moldings by a method similar to Comparative Example I. These moldings were taken from the mold only after a curing time in the mold of 40 minutes and were further cured thermally by heating at 110° C. for 16 hours.

Example 1 a) Preparation of a Prepolymer Containing Isocyanate Groups and Based on 4,4'-MDI/TODI 1,000 parts by weight (0.5 mol) of a poly(ethanediol (0.5 mol)-1,4-butanediol (0.5 mol) adipate (1 mol)) having an average molecular weight of 2,000 (calculated from the experimentally determined hydroxyl number) were heated to 140° C. and, while stirring vigorously, 190 parts by weight (0.76 mol) of 4,4'-MDI heated to 50° C. immediately followed by 100.5 parts by weight (0.38 mol) of solid TODI were added and reacted. After a reaction time of about 30 minutes, this gave a polyaddition product containing urethane and isocyanate groups and having an NCO content of 4.1% by weight, and this polyaddition product was reacted at 120° C. with an additional 100.5 parts by weight (0.38 mol) of solid TODI and cooled while stirring over about 40 minutes to 90° C.

This gave a prepolymer having an NCO content of 6.09% by weight and a viscosity at 90° C. of 4000 mPa.s (measured using a rotation viscometer).

b) Production of Cellular Moldings 100 parts by weight of the isocyanate prepolymer based on 4,4'-MDI/TODI and heated to 90° C., prepared as described in Example 1a, were mixed while stirring vigorously with 3.36 parts by weight of the crosslinker component prepared as described in Comparative Example Ib.

After a stirring time of about 8 seconds, the reaction mixture was introduced into a closable metal mold heated to 80° C., the mold was closed and the reaction mixture was allowed to cure. After a curing time in the mold of 45 minutes, the microcellular molding was removed from the mold and was further cured thermally by heating at 110° C. for 16 hours.

Example 2 a) Preparation of a Prepolymer Containing Isocyanate Groups and Based on 4,4'-MDI/TODI The procedure of Example 1 was repeated, but the 1,000 parts by weight (0.5 mol) of the poly(ethanediol-1,4-butanediol adipate) was admixed first with 285 parts by weight (1.14 mol) of 4,4'-MDI and immediately afterwards with 50 parts by weight (0.19 mol) of TODI.

After a reaction time of about 30 minutes, the resulting polyaddition product containing urethane and isocyanate groups and having an NCO content of 5.18% by weight was treated at from 110 to 120° C. with a further 50 parts by weight (0.19 mol) of TODI.

This gave a prepolymer having an NCO content of 6.10% by weight and a viscosity at 90° C. of 2100 mPa.s (measured using a rotation viscometer).

b) Production of Cellular Moldings

The cellular moldings were produced using the prepolymer of Example 2a and a method similar to Example 1b.

Example 3 a) Preparation of a Prepolymer Containing Isocyanate Groups and Based on 4,4'-MDI/TODI 50 parts by weight (0.19 mol) of solid TODI were dissolved in 285 parts by weight (1.14 mol) of 4,4'-MDI heated to 110° C. 1,000 parts by weight (0.5 mol) of the poly(ethanediol-1,4-butanediol adipate) described in Example 1a, heated to 125 ° C., was added in portions to this solution over a period of 7 minutes while stirring vigorously.

After a reaction time of about 35 minutes in a temperature range from 145 to 120° C., this gave a polyaddition product containing urethane and isocyanate groups and having an NCO content of 5.2% by weight, and this polyaddition product was reacted with a further 50 parts by weight (0.19 mol) of solid TODI. After a reaction time of about 70 minutes, the reaction 25 mixture had cooled to 90° C.

This gave a prepolymer having an NCO content of 6.12% by weight and a viscosity at 90° C. of 2,200 mPa.s (measured using a rotation viscometer).

b) Production of Cellular Moldings

The cellular moldings were produced by a method similar to Example 1b using 100 parts by weight of the prepolymer of Example 3a and 3.38 parts by weight of the crosslinker component prepared as described in Comparative Example Ib.

Example 4 a) Preparation of a Prepolymer Containing Isocyanate Groups and Based on 4,4'-MDI/TODI The procedure of Example 3 was repeated, but a 4,4'-MDI/TODI mixture of 319 parts by weight (1.276 mol) of 4,4'-MDI and 34 parts by weight (0.129 mol) of TODI was used.

The resulting polyaddition product containing urethane and isocyanate groups and having an NCO content of 5.6% by weight was treated with a further 34 parts by weight (0.129 mol) of TODI.

This gave a prepolymer having an NCO content of 6.20% by weight and a viscosity at 90 ° C. of 1,700 mPa.s (measured using a rotation viscometer).

b) Production of Cellular Moldings

The cellular moldings were produced by a method similar to Example 1b using 100 parts by weight of the prepolymer of Example 4a and 3.42 parts by weight of the crosslinker component prepared as described in Comparative Example Ib.

Example 5 a) Preparation of a Prepolymer Containing Isocyanate Groups and Based on 4,4'-MDI/TODI The procedure of Example 3 was repeated, but a 4,4'-MDI/TODI mixture of 335 parts by weight (1.34 mol) of 4,4'-MDI and 25 parts by weight (0.095 mol) of TODI was used.

The resulting polyaddition product containing urethane and isocyanate groups and having an NCO content of 5.73% by weight was treated with 25 parts by weight (0.095 mol) of TODI.

This gave a prepolymer having an NCO content of 6.17% by weight and a viscosity at 90° C. of 1,700 mPa.s (measured using a rotation viscometer).

b) Production of Cellular Moldings

The cellular moldings were produced by a method similar to Example 1b using 100 parts by weight of the prepolymer of Example 5a and 3.40 parts by weight of the crosslinker component prepared as described in Comparative Example Ib.

Example 6 a) Preparation of a Prepolymer Containing Isocyanate Groups and Based on 4,4'-MDI/TODI The procedure of Example 3 was repeated, but 1,000 parts by weight (0.5 mol) of a poly(1,4-butanediol (1 mol)-1,6-hexanediol (1 mol) adipate (2 mol)) having an average molecular weight of 2,000 (calculated from the experimentally determined hydroxyl number) were used in place of the poly(ethanediol-1,4-butanediol adipate).

This gave a prepolymer having an NCO content of 6.02% by weight and a viscosity at 90° C. of 2100 mPa.s (measured using a rotation viscometer).

b) Production of Cellular Moldings 100 parts by weight of the prepolymer of Example 6a and 3.33 parts by weight of the crosslinker component of Comparative Example Ib were used to produce moldings by a method similar to Example 1b.

The cellular moldings produced as described in Comparative Examples Ib to IIIb and Examples 1b to 6b were used to measure the static and dynamic mechanical properties of the microcellular PU elastomers.

The static mechanical properties measured were the tensile strength in accordance with DIN 53 571, the elongation at break in accordance with DIN 53 571, the tear propagation resistance in accordance with DIN 53 515 and the compressive set at 80° C. by a method adapted from DIN 53 572 using spacers having a height of 18 mm and test specimens having a base area of 40×40 mm and a height of 30±1 mm. The compressive set (CS) was calculated in accordance with the equation $$CS = \frac{H_0 - H_2}{H_0 - H_1} \cdot 100 \quad [\%]$$

where $H_0$ is the original height of the test specimen in mm, $H_1$ is the height of the test specimen in the deformed state in mm and $H_2$ is the height of the test specimen after decompression in mm.

Figure 1:
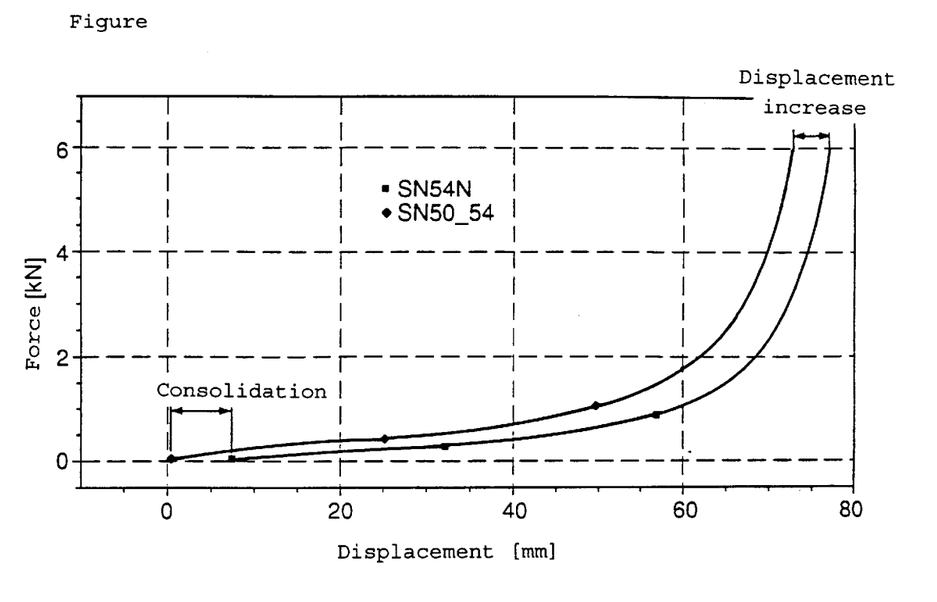
FIG. 1 is a graph illustrating dynamic mechanical properties of polyurethane elastomers of the present invention.

The dynamic mechanical properties determined were the displacement increase (DI) at maximum force and the consolidation (CN) (Figure). The molding for measuring the consolidation was a cylindrical test spring having 3 segment constrictions and a height of 100 mm, an external diameter of 50 mm and an internal diameter of 10 mm. After loading the spring over 100,000 load cycles at a force of 6 kN and a frequency of 1.2 Hz, the CN is measured as the difference between the initial and final heights of the spring and is reported in percent. The consolidation is a measure of the permanent deformation of the cellular PU elastomer during the cyclic fatigue test. The lower this consolidation, the better the dynamic performance of the material.

The height $H_R$ for determining the consolidation after the dynamic test is determined by recording the characteristic line of the spring: $H_O$ is the initial height; the molding is precompressed 3 times using the maximum force (maximum force for the characteristic lines) and the characteristic line is then recorded in a 4th cycle at a compression rate of 50 mm/min. After 10 minutes, $H_1$ is determined: this is the height of the component after recording the characteristic line. Only then is the dynamic test commenced.

$H_R$=residual height after the dynamic test measured after storage for 24 hours at 23° C./50% relative atmospheric humidity after the end of the dynamic test. The reference point (=initial height) used for determining the permanent consolidation after the dynamic test is $H_0$, the height of the spring in a completely "as new" condition, without any compression:

$$CN = \frac{H_0 - H_R}{H_0} \times 100 \quad [\%]$$

The dynamic test is carried out without additional cooling in an air conditioned room at 23° C. and 50% relative atmospheric humidity. The mechanical properties measured on the test specimens are summarized in the following table.

TABLE

Static and dynamic mechanical properties of the cellular PU elastomers as described in Comparative Examples I to III and Examples 1 to 6

| Example Comparative Example | I | II | III | 1 | 2 | 3 | 4 | 5 | 6 |
|---|---|---|---|---|---|---|---|---|---|
| Isocyanate prepolymer based on diisocyanate | MDI | MDI | TODI | 1 MDI/ 1 TODI | 3 MDI/ 1 TODI | 3 MDI/ 1 TODI | 5 MDI/ 1 TODI | 7 MDI/ 1 TODI | 3 MDI/ 1 TODI |
| NCO content [%] | 6.19 | 5.8 | 3.76 | 6.09 | 6.10 | 6.12 | 6.20 | 6.17 | 6.02 |
| Viscosity at 90° C. [mPa.s] | 1600 | 1750 | 5100 | 4000 | 2100 | 2200 | 1700 | 1700 | 2100 |
| Static mechanical properties | | | | | | | | | |
| Compressive set [80° C., %] | 43 | 20 | 18 | 14 | 16 | 18 | 22 | 20 | 21 |
| Tensile strength [N/mm²] | 4.5 | 4.3 | 3.5 | 4.8 | 4.9 | 4.4 | 5 | 4.3 | 4.9 |
| Elongation [%] | 510 | 460 | 430 | 490 | 470 | 460 | 490 | 480 | 460 |
| Tear propagation resistance [N/mm] | 19.9 | 17.3 | 17.1 | 18.9 | 18.1 | 17.8 | 17.8 | 16.1 | 19 |

TABLE-continued

Static and dynamic mechanical properties of the cellular PU elastomers as described in Comparative Examples I to III and Examples 1 to 6

| Example Comparative Example | I | II | III | 1 | 2 | 3 | 4 | 5 | 6 |
|---|---|---|---|---|---|---|---|---|---|
| Dynamic mechanical properties | | | | | | | | | |
| Consolidation [%] | — | 16–18 | 10–12 | 12 | 12 | 12 | 12 | 12 | 13 |
| Displacement increase [mm] | — | 5.0–5.7 | 2.4–2.6 | 2.9–3.1 | 2.9–3.1 | 2.0–2.7 | 2.7–3.1 | 2.7–3.1 | 3.0–3.3 |

We claim:

1. A process for producing polyurethane elastomers comprising the steps of:
   a) forming a first prepolymer having a free NCO of from 0.05 to 8.0 weight % by reacting a polyhydroxyl compound having a molecular weight of from 800 to 6000 and selected from the group consisting of polyester polyols, hydroxyl-containing polycarbonates, and polyoxyalkylene polyols with a mixture of 3,3'-dimethylbiphenyl 4,4'-diisocyanate and a stoichiometric excess of at least one other diisocyanate selected from the group consisting of diphenylmethane diisocyanates; 1,2-diphenylethane diisocyanate; phenylene diisocyanate; aliphatic diisocyanates having from 4 to 12 carbon atoms; and cycloaliphatic diisocyanates having from 6 to 18 carbon atoms;
   b) forming a second prepolymer having a free NCO of from 3.3 to 10.0 weight % by reacting the first prepolymer with an additional amount of 3,3'-dimethylbiphenyl 4,4'-diisocyanate, wherein the equivalence ratio of the hydroxyl groups to the NCO groups of the at least one other diisocyanate to the NCO groups of the 3,3'-dimethylbiphenyl 4,4'-diisocyanate is 1:greater than 1 to 6:0.02 to 6; and
   c) reacting the second prepolymer with an additional amount of the polyhydroxyl compound, a hydroxyl-containing chain extender, a hydroxyl-containing crosslinker, or mixtures thereof to thereby form a polyurethane elastomer.

2. The process of claim 1, wherein step c) further comprises reacting the second prepolymer with a catalyst, a blowing agent, an additive, or mixtures thereof.

3. The process of claim 1, wherein step a) comprises reacting a polyhydroxyl compound having a functionality of from 2 to 3, a molecular weight of from 800 to 6000 and selected from the group consisting of polyester polyols, hydroxyl-containing polycarbonates, and polyoxyalkylene polyols with the mixture of 3,3'-dimethylbiphenyl 4,4'-diisocyanate and a stoichiometric excess of the at least one other diisocyanate.

4. The process of claim 1, wherein step c) further comprises selecting the hydroxyl-containing chain extender from the group consisting of alkanediols, dialkylene glycols, polyoxyalkylene glycols, and mixtures thereof.

5. The process of claim 1, wherein step c) further comprises selecting the hydroxyl-containing crosslinker from the group consisting of trihydric alcohols, tetrahydric alcohols, oligomeric polyoxyalkylene polyols having a functionality of from 3 to 4, and mixtures thereof.

6. The process of claim 1, wherein step a) further comprises reacting the polyhydroxyl compound with a melted mixture of the 3,3'-dimethylbiphenyl 4,4'-diisocyanate and the stoichiometric excess of the at least one other diisocyanate.

7. The process of claim 1, wherein step a) further comprises reacting the polyhydroxyl compound with a melted mixture of the 3,3'-dimethylbiphenyl 4,4'-diisocyanate and a stoichiometric excess of diphenylmethane 4,4'-diisocyanate.

8. The process of claim 1, wherein step a) further comprises reacting a hydroxyl-containing chain extender, a hydroxyl-containing crosslinker, or mixtures thereof with the polyhydroxyl compound and the mixture of 3,3'-dimethylbiphenyl 4,4'-diisocyanate and a stoichiometric excess of at least one other diisocyanate.

9. A process for producing an isocyanate prepolymer comprising the steps of:
   a) forming a first prepolymer having a free NCO of from 0.05 to 8.0 weight % by reacting a polyhydroxyl compound having a molecular weight of from 800 to 6000 and selected from the group consisting of polyester polyols, hydroxyl-containing polycarbonates, and polyoxyalkylene polyols with a mixture of 3,3'-dimethylbiphenyl 4,4'-diisocyanate and a stoichiometric excess of at least one other diisocyanate selected from the group consisting of diphenylmethane diisocyanates; 1,2-diphenylethane diisocyanate; phenylene diisocyanate; aliphatic diisocyanates having from 4 to 12 carbon atoms; and cycloaliphatic diisocyanates having from 6 to 18 carbon atoms; and
   b) forming a second prepolymer having a free NCO of from 3.3 to 10.0 weight % by reacting the first prepolymer with an additional amount of 3,3'-dimethylbiphenyl 4,4'-diisocyanate, wherein the equivalence ratio of the hydroxyl groups to the NCO groups of the at least one other diisocyanate to the NCO groups of the 3,3'-dimethylbiphenyl 4,4'-diisocyanate is 1:greater than 1 to 6:0.02 to 6.

10. The process of claim 9, wherein step a) comprises reacting a polyhydroxyl compound having a functionality of from 2 to 3, a molecular weight of from 800 to 6000 and selected from the group consisting of polyester polyols, hydroxyl-containing polycarbonates, and polyoxyalkylene polyols with the mixture of 3,3'-dimethylbiphenyl 4,4'-diisocyanate and a stoichiometric excess of the at least one other diisocyanate.

11. The process of claim 9, comprising the further step of reacting the second prepolymer with an additional amount of the polyhydroxyl compound, a hydroxyl-containing chain extender, a hydroxyl-containing crosslinker, or mixtures thereof.

12. The process of claim 11, further comprising selecting the hydroxyl-containing chain extender from the group consisting of alkanediols, dialkylene glycols, polyoxyalkylene glycols, and mixtures thereof.

13. The process of claim 11, further comprising selecting the hydroxyl-containing crosslinker from the group consisting of trihydric alcohols, tetrahydric alcohols, oligomeric polyoxyalkylene polyols having a functionality of from 3 to 4, and mixtures thereof.

14. The process of claim 9, wherein step a) further comprises reacting the polyhydroxyl compound with a melted mixture of the 3,3'-dimethylbiphenyl 4,4'-diisocyanate and the stoichiometric excess of the at least one other diisocyanate.

15. The process of claim 9, wherein step a) further comprises reacting the polyhydroxyl compound with a melted mixture of the 3,3'-dimethylbiphenyl 4,4'-diisocyanate and a stoichiometric excess of diphenylmethane 4,4'-diisocyanate.

16. The process of claim 9, wherein step a) further comprises reacting a hydroxyl-containing chain extender, a hydroxyl-containing crosslinker, or mixtures thereof with the polyhydroxyl compound and the mixture of 3,3'-dimethylbiphenyl 4,4'-diisocyanate and a stoichiometric excess of at least one other diisocyanate.

17. The process of claim 16, further comprising selecting the hydroxyl-containing chain extender from the group consisting of alkanediols, dialkylene glycols, polyoxyalkylene glycols, and mixtures thereof.

18. The process of claim 16, further comprising selecting the hydroxyl-containing crosslinker from the group consisting of trihydric alcohols, tetrahydric alcohols, oligomeric polyoxyalkylene polyols having a functionality of from 3 to 4, and mixtures thereof.

* * * * *